United States Patent
Marquez (10) Patent No.: US 8,141,267 B2
(45) Date of Patent: Mar. 27, 2012

(54) CONTRACTOR SOLOIST MEASURING AID AND METHODS OF USE

(76) Inventor: Steven A. Marquez, Laredo, TX (US)

( * ) Notice: Subject to any disclaimer, the term of this patent is extended or adjusted under 35 U.S.C. 154(b) by 32 days.

(21) Appl. No.: 12/857,749

(22) Filed: Aug. 17, 2010

(65) Prior Publication Data

US 2012/0042532 A1 Feb. 23, 2012

(51) Int. Cl.
*G01B 3/10* (2006.01)
(52) U.S. Cl. .......................... 33/758; 33/770
(58) Field of Classification Search .............. 33/758, 33/755, 757, 759, 760, 770
See application file for complete search history.

(56) References Cited

U.S. PATENT DOCUMENTS

| | | | | |
|---|---|---|---|---|
| 2,853,785 A * | 9/1958 | Raifsnider | | 33/760 |
| 3,021,599 A * | 2/1962 | Odom | | 33/275 R |
| 4,507,869 A * | 4/1985 | Stude | | 33/42 |
| 5,172,486 A * | 12/1992 | Waldherr | | 33/770 |
| 5,291,664 A * | 3/1994 | Pinney et al. | | 33/770 |
| 5,421,100 A * | 6/1995 | Leore | | 33/770 |
| 5,481,813 A * | 1/1996 | Templeton | | 33/758 |
| 5,782,007 A * | 7/1998 | Harris | | 33/768 |
| 5,815,940 A * | 10/1998 | Valentine, Sr. | | 33/770 |
| 6,295,739 B1 * | 10/2001 | Kraft | | 33/758 |
| 6,578,274 B1 * | 6/2003 | Tango et al. | | 33/1 G |
| 7,484,313 B1 * | 2/2009 | Ogilvie | | 33/770 |
| 7,490,415 B1 * | 2/2009 | Cubbedge | | 33/770 |

\* cited by examiner

*Primary Examiner* — Christopher Fulton
(74) *Attorney, Agent, or Firm* — Leyendecker & Lemire, LLC; Terrence M. Wyles, Esq.

(57) ABSTRACT

A small multi-tool device designed to aid the performance of length measurements using measuring-tape devices is disclosed. In a typical embodiment, the multi-tool device is comprised of two substantially parallel planar support surfaces, coupled to each other at one edge, and with holes strategically disposed through the surfaces to facilitate the insertion of elongated and rigid members that lay on or otherwise engage parts of the target structure to be measured. The multi-tool device is designed to facilitate hypotenuse measurements, as well as measurements on structures where the edge to serve as an anchor point is rough, rounded, or non-existent. Further, the multi-tool device can also serve to act as a clip/clamp for various documents or the tops of bags of goods.

20 Claims, 6 Drawing Sheets

CONTRACTOR SOLOIST MEASURING AID AND METHODS OF USE

BACKGROUND OF THE INVENTION

Most measuring-tapes, including retractable measuring-tape devices, have a positioning tab, or "tang", located at their zero point. The tang of a measuring tape is typically hooked over the edge of the surface or object being measured, which helps a user take a length measurement without needing the aid of another person to hold down the zero end of the measuring tape. However, when the distance to be measured is large, or if the edge to act as an anchor point for the measurement rough or rounded (that is, not square), or if the needed anchor point is not easily accessible, then a traditional measuring-tape device is difficult to use by a single person.

Many others have attempted to solve this problem with various devices. For example, U.S. Pat. No. 5,873,174 to Kraft uses a triangular, heavily weighted assembly that engages a surface with three threaded screws, each with a hardened conical point. One of the screws is engaged with the eye at the end of the measuring tape. This solution is bulky and generally requires that the screws pierce the supporting surface, which is often undesirable. Another example is U.S. Pat. No. 5,291,664 to Pinney et al., which discloses a corner-to-corner tape measure apparatus incorporating V-shaped webs to accommodate opposed corners of the work piece to be measured. Each V-shaped web can accept a measuring tape through it. This solution is very limited in application, as well as a bit complex and unwieldy. In the case of U.S. Pat. No. 6,115,931 to Arcand, it discloses a retractable tape measure with a permanently mounted adapter assembly to receive interchangeable fastener attachments for securing the end of the tape blade to a surface. The interchangeable fasteners are designed to pierce or screw into the target surface along the same longitudinal axis of the tape blade, though the bracket also allows for some swiveling of the tape blade relative to the mounted fastener. This solution is both overly complex and limited in its application. Finally, yet another proposed solution is U.S. Pat. No. 7,204,037 to Kane, which discloses a framer's tape hook that has been modified to allow the user to offset the tape hook by one-half of the thickness of any framing member. This solution is very narrow in its applications.

What is needed is a more-effective and simple tool to enhance the usability of a measuring-tape device.

DETAILED DESCRIPTION

Overview

The various embodiments of the invention encompass a small, easily manufactured, multi-tool device for aiding a person in making length measurements with a measuring-tape device without the aid of a second person and/or in situations where there is no readily available or effective anchor point for the tang of the measuring-tape device. In one embodiment, the device provides a straight edge on which to engage a tape measure hook/tang, and is adapted to enable measuring from points that are traditionally difficult to measure from, such as an outside corner, a rough or rounded surface, or a point where no edge resides for use as an anchor point. In many embodiments, the device can be non-destructively mounted over the edge of a surface to be used as an anchor point for a measurement by inserting two elongated and rigid members (such as, but not limited to, two sixteen-penny nails) in holes disposed on the planar side of the device, which is rectangular in shape, and typically square. In some embodiments, the longitudinal sides or shafts of the two elongated and rigid members, which extend out from the holes of the device, rest adjacent to the edge of the surface to serve as the anchor point, but need not be actually fastened or fixed to the surface at the anchor point. In other embodiments and applications, the two elongated and rigid members are of a fastener type and are used to pierce or fasten into the surface to be used as an anchor point.

In still more embodiments, the device can be used as a block rule (e.g., a two-inch block rule) for measurement in tight or dangerous places, as it has divisional markings to facilitate measurements, and in such applications is made to a size certain (e.g., two inches square). This feature is handy in situations where the use of a measuring-tape device is cumbersome.

The device is also adapted to function as a clip, allowing it to attach in a convenient location by clipping to a user's suspenders, tool belt, pocket, speed square, etc. It is also adapted to function as a heavy duty clip, such as a money clip, clip for holding blue prints, a bag closure, etc In addition, in many embodiments, the multi-tool device can serve as an effective and convenient clip for securing documents, money, blueprints, snack bags, and similar items.

In some embodiments, the device has at least one magnetized support surface, which can be useful for convenient, findable storage of the device by affixing the device to a ferromagnetic surface, or which can be used to conveniently hold with ferromagnetic elongated and rigid support members (such as sixteen-penny nails) when not being used to actually create an anchor point for tape measurements, or which can aid in fixing an anchor point on a ferromagnetic surface.

Terminology

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", and similar terms, as used in this patent application specification (including the claims and drawings), refer to structures that can be uncoupled from an adjoining structure with relative ease (i.e., non-destructively and without a complicated or time-consuming process) and can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments, and are not necessarily intended to be construed as limiting.

As applicable, the terms "about" and "generally" as used herein unless otherwise indicated means a margin of ±20%. Also, as applicable, the term "substantially" as used herein unless otherwise indicated means a margin of ±10%. It is to be appreciated that not all uses of the above terms are quantifiable such that the referenced ranges can be applied.

The term "flexibly rigid", as used in this specification and the appended claims, refers to a structural integrity that allows a structure to substantially maintain its manufactured shape, yet allows for some flexing of the manufactured shape to facilitate effective applied uses of the manufactured structure.

The term "anchor point", as used in this specification and the appended claims, refers to an established/fixed point on a surface for the zero point of a measuring tape, from which a measuring tape is extended to make a length measurement.

The terms "tang" and "hook", as used in this specification and the appended claims, and in reference to a measuring-tape device, refers to the tongue-like structure typically disposed at the end of a measuring tape that is used to help establish an anchor point for a length measurement with a measuring tape.

First Embodiment

A Multi-Tool Device for Aiding in Length Measurements

This embodiment is directed generally to a multi-tool device for assisting in performing various measurements in length using a measuring-tape device. This multi-tool device can also be used as a small block rule for tight, difficult-to-access, corners, and as a clamp or clip for holding or securing documents, bags, and the like.

Figure 1:
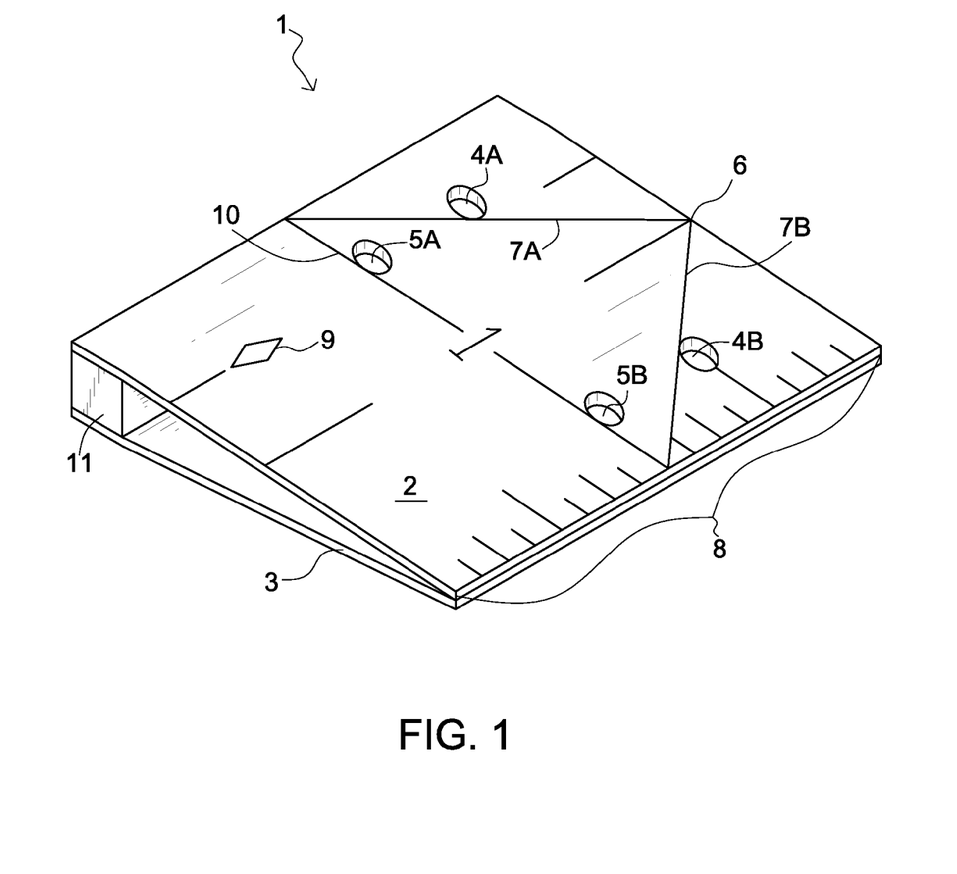
FIG. 1 depicts an isometric view of one embodiment of a multi-tool device suitable to aid in tape measurements.
Figure 2A:
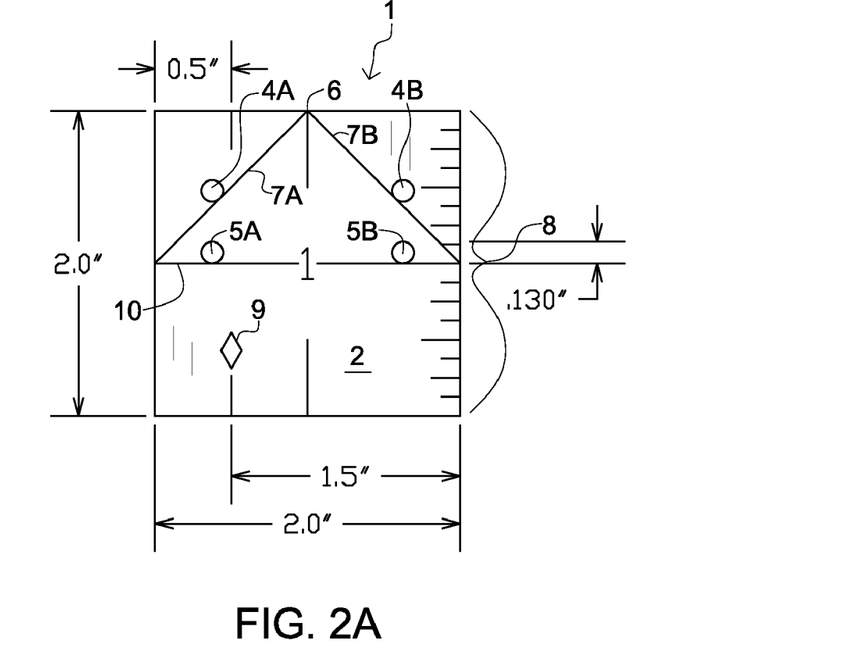
FIG. 2A depicts a top view of one embodiment of a multi-tool device one embodiment of a multi-tool device suitable to aid in tape measurements. The first support member 2 is shown, and the second support member 3, which is disposed below the first support member, is hidden from view.
Figure 2B:
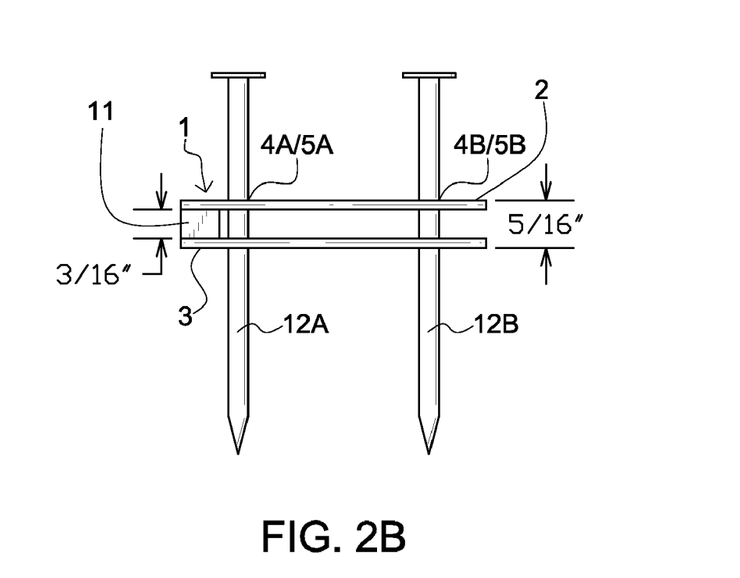
FIG. 2B depicts one side/edge view of one embodiment of a multi-tool device suitable to aid in tape measurements, which also includes the depiction of two elongated and rigid tool-support members 12A, 12B disposed through corresponding holes 4A, 4B in the first and second support members 2, 3.

Refer to FIGS. 1-2B. One typical embodiment comprises a first planar support member 2 and a second planar support member 3, each being two inches square (though this particular sizing is not mandatory and can be varied for different applications, including metric applications), wherein the two support members are positioned adjacent to each other, but separated by a coupling member 11 along one edge. In other embodiments, the two corresponding support members 2, 3 are rectangular in shape, but not necessarily square.

In many embodiments, at least one edge on the first support member 2 is that is adapted to be engaged with the hook or tang of a measuring-tape device.

In some embodiments, at least one edge of the first support member 2 has an edge designated to facilitate hypotenuse measurements, with the designated hypotenuse-measuring edge having a center marking 6, equidistant from each end of the designated hypotenuse-measuring edge. In other embodiments, the designated hypotenuse-measuring edge also has two substantially equal-length lined markings 7A, 7B emanating from the center marking 6, with each lined marking 7A, 7B being orthogonal with respect to the other lined marking, and with each lined marking's 7A, 7B distal end, relative to the center marking 6, intersecting with an edge adjacent to hypotenuse-measuring edge, and with each lined marking 7A, 7B extending to a different first support member 2 edge that is adjacent to the designated hypotenuse-measuring edge.

In general, the first and second support members are comprised of a flexibly rigid material. In some embodiments, the flexibly rigid material is of a type selected from the group consisting of elastomers, hard plastics, vulcanized rubber, metal, and wood. In still other embodiments, at least one support member has magnetic properties, which can be handy to store the multi-tool device 1 on a ferromagnetic surface or to magnetically hold tool-support members that are made of ferromagnetic materials.

In an embodiment, corresponding to the first support member 2, the second support member 3 is planar and substantially shaped and sized the same as the first support member 2, and the first and second support members 2, 3 are disposed adjacent to one another, but separated by a distance along at least one pair of corresponding edges.

In many embodiments, the first and second support members 2, 3 are coupled at one corresponding edge by a coupling member 11, wherein the separation distance between the first and second support members 2, 3, referred to supra, is provided by the coupling member 11. This distance can vary according to application; however, in one embodiment, the separation along the coupled edge between the first and second support surfaces 2, 3 is approximately 3/16 inches. In some embodiments, the coupling member 11 is comprised of multiple layers of short strips of leather. In other embodiments, the coupling member 11 can be comprised of rubber, elastomeric materials, other plastics, metal, or wood. The coupling member 11 and the first and second support members 2, 3 can be fixed together by discrete fasteners, such as rivets, screws, staples, and the like. In alternate embodiments, the coupling member 11 and the first and second support members 2, 3 can be fixed together by continuous fastening, such as gluing, thermoplastic welding, or metallic welding. In still more embodiments, the coupling member 11 and the first and second support members 2, 3 can be formed together in a single manufacturing process, where all three components are made from the same material and either machine-folded at the designated corresponding edge or injection-molded as a unit.

In an embodiment, a first pair of holes 4A, 4B is disposed in and through the first support member 2 for facilitating hypotenuse measurements, wherein one of the first pair of holes 4A, 4B is disposed tangentially along the outer side of one of the lined markings 7A, 7B emanating from the center marking 6 along the hypotenuse-measuring edge, the other hole of the first pair of holes 4A, 4B is disposed tangentially along the outside of the other of the lined markings 7A, 7B emanating from the center marking 6 along said hypotenuse-measuring edge, and each hole of the first pair of holes 4A, 4B is disposed along its associated lined marking 7A, 7B at a substantially equal distance from the center marking 6, and generally disposed at the midpoint of its associated lined marking 7A, 7B. Also, in an embodiment, a second pair of holes (not shown in the figures) is disposed in and through the second support member 3 for facilitating hypotenuse measurements, wherein the second pair of holes is disposed to be located at positions on the second support member 3 that correspond to the positions of the first pair of holes 4A, 4B for facilitating hypotenuse measurements, and the corresponding first and second pairs of holes 4A, 4B are adapted for each pair of corresponding holes to receive and hold an elongated and rigid tool-support member 12A, 12B inserted by a user through the multi-tool device. The insertion of these tool-support members 12A, 12B would be performed in order to engage an outer edge of a substantially right-angled corner, forming an anchor point from which a hypotenuse tape measurement is to be made, with the center marking 6 being disposed at or near the apex of the right-angled corner.

In some other embodiments, the first support member 2 has a plurality of markings 8 along at least one edge adapted to facilitate length measurements along that at least one edge.

In an embodiment, each of the first and second support members 2, 3 are equally-sized squares of pre-determined edge length to be effective for small length measurements in difficult-to-access areas. In a typical application, the multi-tool device measures two inches on each side.

In other variations of the multi-tool device, a third pair of holes 5A, 5B is disposed in and through the first support member 2 for establishing an anchor point to facilitate length measurements from a rough or rounded surface, wherein each hole of the third pair of holes 5A, 5B is disposed tangentially to a straight line 10 that spans across two opposite edges of the first support member 2, each hole of the third pair of holes 5A, 5B is disposed on the same side of the straight line 10 as the other hole of the third pair of holes 5A, 5B, the straight line 10 can be real or imaginary, the straight line 10 is disposed to be substantially parallel with, and disposed one inch from, at least one edge (designated to serve as the anchor edge for a length measurement) of the first support member 2, and each hole of the third pair of holes 5A, 5B are separated by a distance. The distance between the holes of the third pair of holes 5A, 5B need only be far enough along the straight line 10 to allow the multi-tool device to be stabilized along the surface edge acting as the anchor point when elongated and rigid tool-support members 12A, 12B are inserted through the and through the holes. Also, in and embodiment, a fourth pair of holes (not shown in the figures) is disposed in and through the second support member 3 for establishing an anchor point to facilitate length measurements from a rough or rounded surface, wherein the fourth pair of holes is disposed to be located at positions on the second support member 2 that correspond to the positions of the third pair of holes 5A, 5B for facilitating length measurements from a rough or rounded surface, and the corresponding third and fourth pairs of holes 5A, 5B are adapted for each pair of corresponding holes to receive and hold an elongated and rigid tool-support member 12A, 12B inserted by a user through the multi-tool device. The insertion of these tool-support members 12A, 12B would be performed in order to engage an outer edge of a substrate, forming an anchor point from which a tape measurement is to be made.

The size of the holes 4A, 4B, 5A, 5B designed to receive elongated and rigid tool-support members 12A, 12B can vary, depending on the type and size of tool-support members to be used. In some embodiments, standard sixteen-penny nails are used, as they are both inexpensive and readily available at a construction site. In such a case, the holes bored to receive the sixteen-penny nails are typically 0.130 inches in diameter, and a 5/16-inch drill bit may be used to create the holes. Optimally, the holes will snuggly engage with the inserted tool-support members 12A, 12B so that they do not easily slip and fall out of the multi-tool device 1 as the multi-tool device 1 is being used. To this end, the fact that in many embodiments that first and second support surfaces 2, 3 have a tapered separation distance can aid in achieving a slight clamping action on the inserted tool-support members 12A, 12B. In still other embodiments, non-piercing, non-threaded studs can be used as tool-support members 12A, 12B. In yet more alternative embodiments, threaded screws or bolts can be used as tool-support members 12A, 12B.

In some embodiments, the multi-tool device is adapted to be used as a document-retaining device or as a bag-closure device, wherein the distance between the first and second support members 2, 3 is tapered from the coupling member 11 to reach a smaller separation distance between the distal edges of the first and second support members 2, 3, relative to the coupling member 11. The shape and rate of the tapering can be varied substantially, including in some embodiments, where the separation tapers down to zero, allowing material from the first and second support members 2, 3, at or near said distal edges relative to the coupling member 11, to make contact. See FIGS. 6A-6C for examples of three such variations.

In still other embodiments, the first support member 2 has at least one specialized marking 9 (such as, but not necessarily, a diamond shape) that denotes a point 1.5 inches away from at least one edge of the first support member 2 that corresponds to the width of standard lumber pieces (e.g., 2×4, 2×6, 2×8, etc.). In variations, such specialized markings 9 can be spaced from the edge of the first support member 2 to suit other standard dimensions.

It should be noted that all references to markings on a support surface herein can be printed or etched onto the support surface. Moreover, there is no requirement that any line marking be continuous.

Finally, the above description focuses on structures and markings on the first support surface 2 for simplicity. It would be appreciated by one ordinarily skilled in the art that the above description for the first support surface can easily be applied to the second support surface 3; that is, in some embodiments, the multi-tool device is reversible and can be used with either the first or second support surfaces 2, 3 in contact with a substrate associated with a target length measurement. Such an obvious variation is intended to be encompassed by this disclosure.

Second Embodiment

A Method of Making a Multi-Tool Device for Aiding in Length Measurements

This embodiment is directed generally to a method for making a multi-tool device for assisting in performing various measurements in length using a measuring-tape device. This multi-tool device can also be used as a small block rule for tight, difficult-to-access, corners, and as a clamp or clip for holding or securing documents, bags, and the like.

Refer to FIGS. 1-2B, and 6A-6C. In one embodiment, the method comprises the steps of:

Providing a first support member 2, wherein the first support member 2 is planar and substantially rectangular in shape, wherein the first support member 2 has at least one straight edge adapted to be engaged with the tang of a measuring-tape device, wherein the first support member 2 has an edge designated to facilitate hypotenuse measurements, the designated hypotenuse-measuring edge having a center marking 6, equidistant from each end of the designated hypotenuse-measuring edge, the designated hypotenuse-measuring edge having two substantially equal-length lined markings 7A, 7B emanating from the center marking 6, each lined marking 7A, 7B being orthogonal with respect to the other lined marking 7a, 7b, each lined marking's 7A, 7B distal end, relative to the center marking 6, intersecting with an edge adjacent to the hypotenuse-measuring edge, and each lined marking 7A, 7B extending to a different first support member 2 edge that is adjacent to the designated hypotenuse-measuring edge;

Providing a second support member 3, wherein the second support member 3 is planar and substantially shaped and sized the same as the first support member 2, and wherein the first and second support members 2, 3 are disposed adjacent to one another, but separated by a distance along at least one pair of corresponding edges;

Providing a coupling member 11, wherein the coupling member 11 is adapted to couple the first and second support members 2, 3 along one of the corresponding edges of the first and second support members 2, 3, and wherein the separation distance between the first and second support members 2, 3 is provided by the coupling member 11;

Providing a first pair of holes 4A, 4B disposed in and through said first support member 2 for facilitating hypotenuse measurements, wherein one hole of said first pair of holes 4A, 4B is disposed tangentially along the outer side of one of the lined markings 7A, 7B emanating from the center marking 6 along the hypotenuse-measuring edge, wherein the other hole of the first pair of holes 4A, 4B is disposed tangentially along the outside of the other of the lined markings 7A, 7B emanating from said center marking 6 along the hypotenuse-measuring edge, and wherein each hole of the first pair of holes 4A, 4B is disposed along its associated lined marking at a substantially equal distance from the center marking 6, and generally disposed at the midpoint of its associated lined marking 7A, 7B; and Providing a second pair of holes (not shown in the figures) disposed in and through the second support member 3 for facilitating hypotenuse measurements, wherein the second pair of holes is disposed to be located at positions on the second support member 3 that correspond to the positions of the first pair of holes 4A, 4B for facilitating hypotenuse measurements, wherein the corresponding first and second pairs of holes 4A, 4B are adapted for each pair of corresponding holes to receive and hold an elongated and rigid tool-support member 12A, 12B inserted by a user through the multi-tool device in order to engage an outer edge of a substantially right-angled corner, forming an anchor point from which a hypotenuse tape measurement is to be made, with the center marking 6 being disposed at or near the apex of said right-angled corner.

This embodiment can be further enhanced, wherein the first support member 2 has a plurality of markings 8 along at least one edge adapted to facilitate length measurements along the at least one edge; and each of the first and second support members 2, 3 are equally-sized squares of pre-determined edge length (e.g., 2 square inches) to be effective for small length measurements in difficult-to-access areas.

This embodiment can be further enhanced, wherein the method further comprises the steps of:

Providing a third pair of holes 5A, 5B disposed in and through said the first support member 2 for establishing an anchor point to facilitate length measurements from a rough or rounded surface, wherein each hole of the third pair of holes 5A, 5B is disposed tangentially to a straight line 10 that spans across two opposite edges of the first support member 2, wherein each hole of the third pair of holes 5A, 5B is disposed on the same side of the straight line 10 as the other hole of the third pair of holes 5A, 5B, wherein the straight line 10 can be real or imaginary, wherein the straight line 10 is disposed to be substantially parallel with, and disposed one inch from, at least one edge of the first support member 2, the at least one edge to serve as the anchor edge for a length measurement, and wherein each hole of the third pair of holes 5A, 5B are separated by a distance;

Providing a fourth pair of holes (not shown in the figures) disposed in and through the second support member 3 for establishing an anchor point to facilitate length measurements from a rough or rounded surface, wherein the fourth pair of holes is disposed to be located at positions on the second support member 3 that correspond to the positions of the third pair of holes 5A, 5B for facilitating length measurements from a rough or rounded surface, and wherein the corresponding third and fourth pairs of holes 5A, 5B are adapted for each pair of corresponding holes to receive and hold an elongated and rigid tool-support member 12A, 12B inserted by a user through said multi-tool device in order to engage an outer edge of a substrate, forming an anchor point from which a tape measurement is to be made.

Figure 6A:
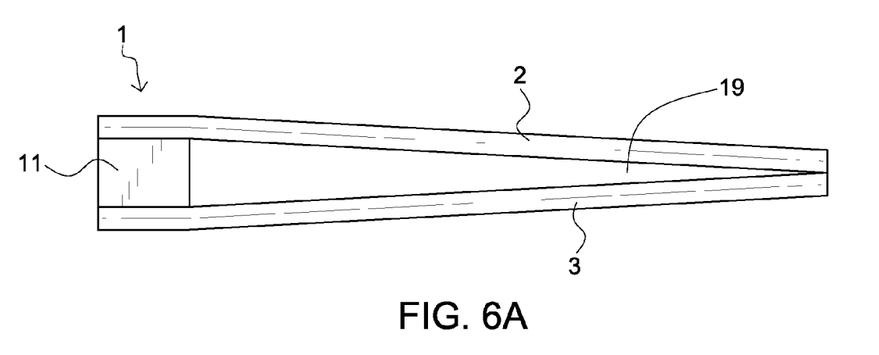
FIG. 6A depicts one side/edge view of one embodiment of a multi-tool device suitable to aid in tape measurements, which also can be used as clip device for documents, bag closures, etc. This particular embodiment depicts an alternate embodiment for how the distance between the two support members 2, 3 can be tapered/bent to facilitate spring-like clip capabilities.
Figure 6B:
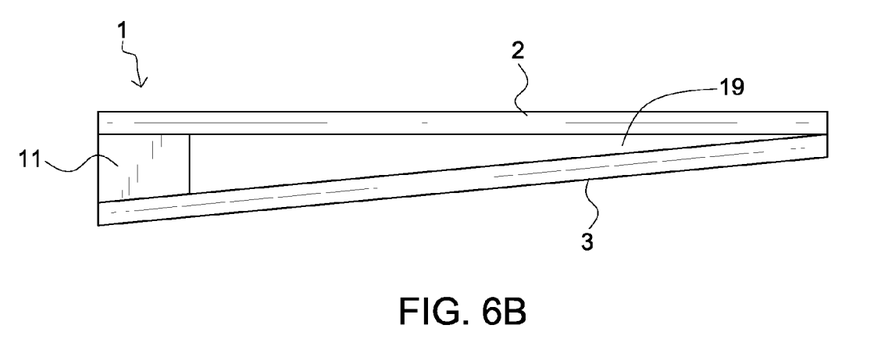
FIG. 6B depicts one side/edge view of one embodiment of a multi-tool device suitable to aid in tape measurements, which also can be used as clip device for documents, bag closures, etc. This particular embodiment depicts an alternate embodiment for how the distance between the two support members 2, 3 can be tapered/bent to facilitate spring-like clip capabilities.
Figure 6C:
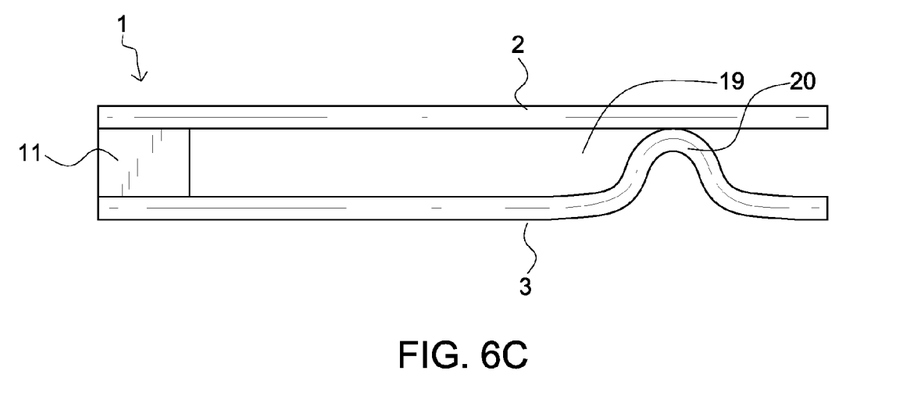
FIG. 6C depicts one side/edge view of one embodiment of a multi-tool device suitable to aid in tape measurements, which also can be used as clip device for documents, bag closures, etc. This particular embodiment depicts an alternate embodiment for how the distance between the two support members 2, 3 can be tapered/bent/shaped to facilitate spring-like clip capabilities.

This embodiment can be further enhanced, wherein the multi-tool device is adapted for use as a document retainer or bag-closure device, and wherein the method further comprises the step of:

Ensuring that the distance between the first and second support members 2, 3 is tapered from the coupling member 11 to reach a smaller separation distance between the distal edges of the first and second support members 2, 3, relative to the coupling member 11.

In some enhancements, the shape and rate of the tapering can be varied substantially, including in some embodiments, where the separation tapers down to zero, allowing material from the first and second support members 2, 3, at or near said distal edges relative to the coupling member 11, to make contact. See FIGS. 6a-6c for examples of three such variations.

This embodiment can be further enhanced, wherein the first and second support members 2, 3 are comprised of flexibly rigid material. In some variations, this flexibly rigid material is of a type selected from the group consisting of elastomers, hard plastics, vulcanized rubber, metal, and wood. In still other variations, at least one of the support members 2, 3 has magnetic properties.

This embodiment can be further enhanced, wherein the coupling member 11 is comprised of multiple layers of short strips of leather. In still other enhancements, the coupling member 11 can be comprised of rubber, elastomeric materials, other plastics, metal, or wood. Additionally, in some embodiments, the coupling member 11 and the first and second support members 2, 3 can be fixed together by discrete fasteners, such as rivets, screws, staples, and the like. In alternate variations, the coupling member 11 and the first and second support members 2, 3 can be fixed together by continuous fastening, such as gluing, thermoplastic welding, or metallic welding. In still more variations, the coupling member 11 and the first and second support members 2, 3 can be formed together in a single manufacturing process, where all three components are made from the same material and either machine-folded at the designated corresponding edge or injection-molded as a unit.

In still other enhancements, the first support member 2 has at least one specialized marking 9 (such as, but not necessarily, a diamond shape) that denotes a point 1.5 inches away from at least one edge of the first support member 2 that corresponds to the width of standard lumber pieces (e.g., 2×4, 2×6, 2×8, etc.). In variations, such specialized markings 9 can be spaced from the edge of the first support member 2 to suit other standard dimensions.

It should be noted that all references to markings on a support surface herein can be printed or etched onto the support surface. Moreover, there is no requirement that any line marking be continuous.

Finally, the above method-of-making description focuses on structures and markings on the first support surface 2 for simplicity. It would be appreciated by one ordinarily skilled in the art that the above description for the first support surface can easily be applied to the second support surface 3; that is, in some embodiments, the multi-tool device is reversible and can be used with either the first or second support surfaces 2, 3 in contact with a substrate associated with a target length measurement. Such an obvious variation is intended to be encompassed by this disclosure.

Third Embodiment

Figure 3:
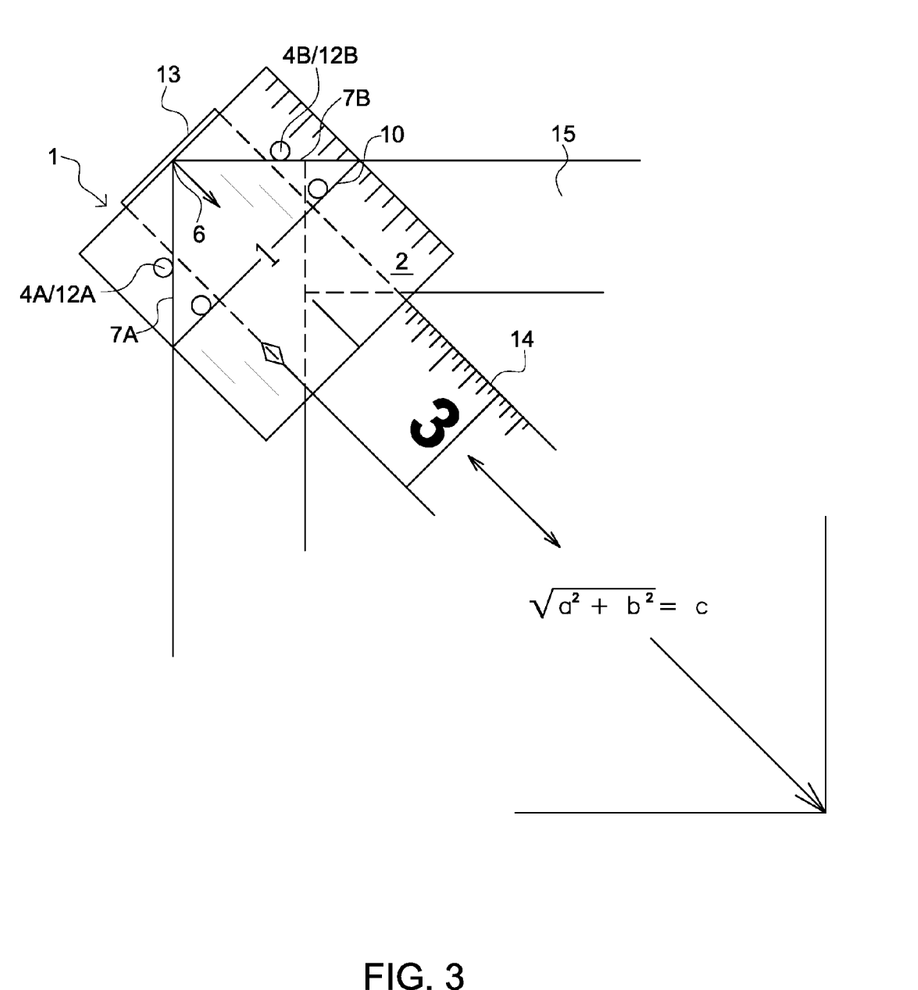
FIG. 3 depicts one embodiment of a multi-tool device suitable to aid in tape measurements being used for a hypotenuse measurement.

A Method for Using a Device for Multi-Tool Device for Aiding in Hypotenuse-Length Measurements Refer to FIGS. 1-3. This embodiment is directed generally to a method for using a multi-tool device 1 according the First Embodiment, discussed supra, for performing a hypotenuse measurement from a substantially right-angled corner of a structure 15; the corner structure having a first planar face, a first surface orthogonal to that first planar face, and a second surface orthogonal to that first planar face. In one variation, the method comprises the steps of:

Obtaining two elongated and rigid tool-support members 12A, 12B;

Obtaining a measuring-tape device 14, 14A, the measuring-tape device having a tang 13 at one end;

Positioning the measuring-tape device's tang 13 and measuring tape 14 between the first and second support members 2, 3, wherein the tang 13 is disposed just beyond, and in contact with, the edge of either the first or second support surface 2, 3, on the end of the multi-tool device 1 having the center marking 6, and wherein said tang is substantially centered over said center marking;

Inserting one of the elongated and rigid tool-support members 12A, 12B into and through each corresponding pairs of holes associated with said first and second pairs of holes 4A, 4B;

Placing the multi-tool device 1, with the inserted elongated and rigid tool-support members 12A, 12B, and with the measuring tape 14 and tang 13 inserted, over the corner 15 of the structure from which the hypotenuse measurement is to be taken, wherein a longitudinal side of the extended part of one of the inserted elongated and rigid tool-support members 12A, 12B is disposed in contact with the first surface orthogonal to the first planar surface of the structure corner 15, wherein a longitudinal side of the extended part of the other of the inserted elongated and rigid tool-support members 12A, 12B is disposed in contact with the second surface orthogonal to the first planar surface of the structure corner 15, and wherein the center marking 6 on the multi-tool device 1 is substantially aligned with the apex of said corner of the structure 15 that serves as the established anchor point for the hypotenuse measurement; and Using the measuring-tape device 14, 14A anchored at its tang 13 at the established anchor point, measuring a length over a user-specified span.

Fourth Embodiment

Figure 4A:
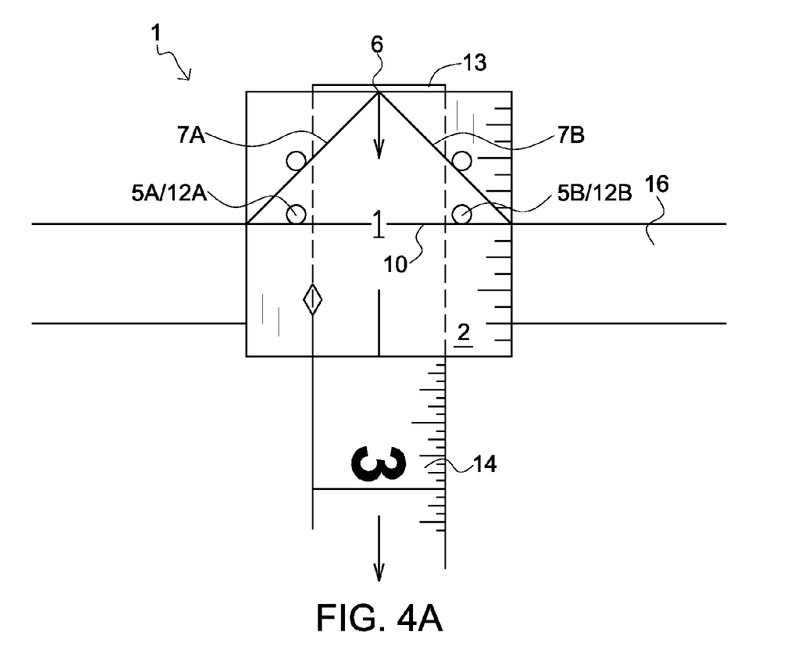
FIG. 4A depicts a top view of one embodiment of a multi-tool device suitable to aid in tape measurements being used to make a measurement when the anchoring edge is rough or rounded.
Figure 4B:
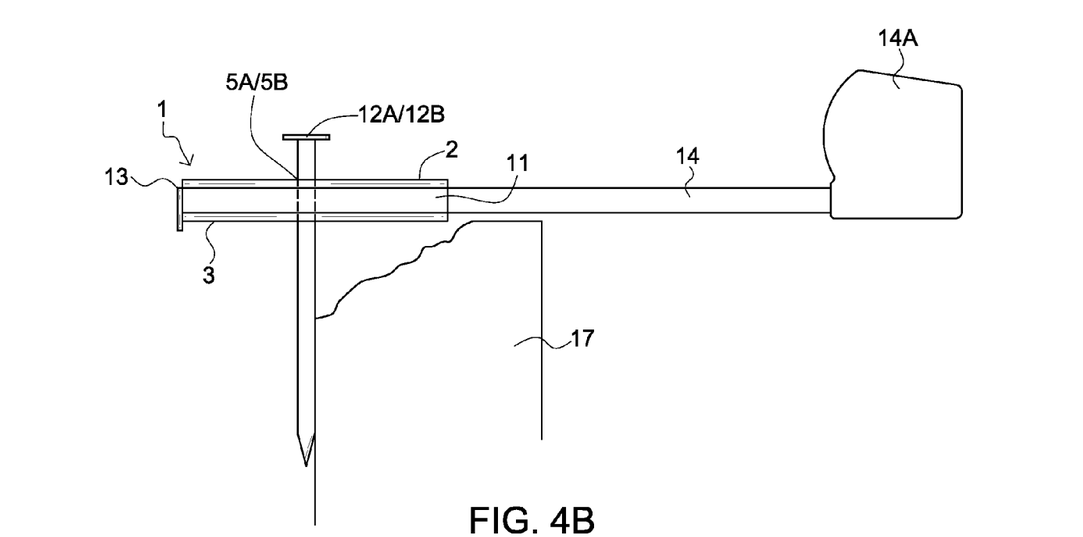
FIG. 4B depicts a side view of one embodiment of a multi-tool device suitable to aid in tape measurements being used to make a measurement when the anchoring edge is rough or rounded.

A Method for Using a Device for Multi-Tool Device for Aiding in Length Measurements from a Rough or Rounded Surface Refer to FIGS. 1-2B, 4A-4B. This embodiment is directed generally to a method for using a multi-tool device 1 according the First Embodiment, discussed supra, for performing a length measurement from a rough or rounded surface 16, 17, the rough or rounded surface lacking a definitive corner edge upon which the tang 13 of a measuring-tape device 14, 14A can be readily abutted. In one variation, the method comprises the steps of:

Obtaining two elongated and rigid tool-support members 12A, 12B;

Obtaining a measuring-tape device 14, 14A, the measuring-tape device having a tang 13 at one end;

Positioning the measuring-tape device's tang 13 and measuring tape 14 between the first and second support members 2, 3, wherein the tang 13 is disposed just beyond, and in contact with, the anchor edge of either the first or second support surface 2, 3;

Inserting one of the elongated and rigid tool-support members 12A, 12B into and through each corresponding pairs of holes associated with the third and fourth pairs of holes 5A, 5B;

Placing said multi-tool device 1, with the inserted elongated and rigid tool-support members 12A, 12B, and with the measuring tape 14 and tang inserted 13, over the rough or rounded edge of the structure 16, 17 from which the length measurement is to be taken, wherein a longitudinal side of the extended part of each of the inserted elongated and rigid tool-support members 12A, 12B is disposed in contact with the distal side of said rough or rounded edge of the structure 16, 17, thereby establishing an anchor point for the length measurement using the measuring-tape device 14, 14A; and Using the measuring-tape device 14, 14A, anchored at its tang 13 at the established anchor point, by measuring a length over a user-specified span, and subtracting one inch from the indicated tape measurement in order to compensate for the one-inch offset for the established anchor point.

Fifth Embodiment

Figure 5:
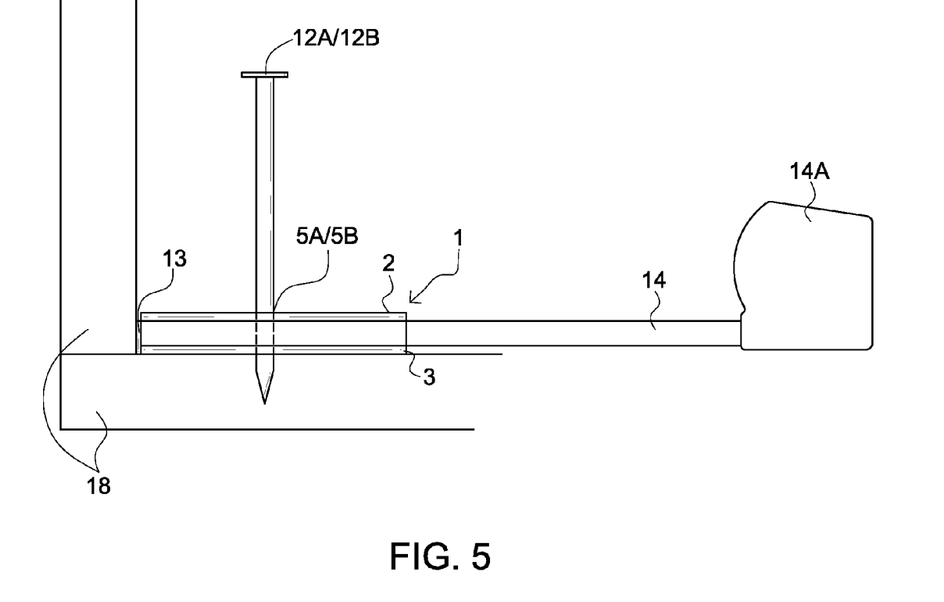
FIG. 5 depicts a side view of one embodiment of a multi-tool device suitable to aid in tape measurements being used to make a measurement when a suitable anchoring edge is inaccessible or non-existent.

A Method for Using a Device for Multi-Tool Device for Aiding in Length Measurements from a Location Lacking an Anchor Point Refer to FIGS. 1-2B, 5. This embodiment is directed generally to a method for using a multi-tool device 1 according the First Embodiment, discussed supra, for performing a length measurement from a location on a structure lacking an anchor point, such as in a closed corner 18. In one variation, the method comprises the steps of:

Obtaining two elongated and rigid tool-support members 12A, 12B, each of which is adapted to pierce the surface of the structure 18 to serve as an anchor point for the length measurement;

Obtaining a measuring-tape device 14, 14A, the measuring-tape device having a tang 13 at one end;

Positioning the measuring-tape device's tang 13 and measuring tape 14 between the first and second support members 2, 3, wherein the tang 13 is disposed just beyond, and in contact with, the anchor edge of either the first or second support surface 2, 3;

Placing said multi-tool device 1 at a user-selected position from which a length measurement is to be taken;

Inserting one of the elongated and rigid tool-support members 12A, 12B into and through each of the corresponding pairs of holes associated with the first and second pairs of holes 4A, 4B, then causing each of the elongated and rigid tool-support members 12A, 12B to pierce and frictionally couple with the surface of the structure serving as the anchor point, thereby fixing the multi-tool device 1 in place; and Using the measuring-tape device 14, 14A anchored at its tang 13 at said established anchor point by measuring a length over a user-specified span, and subtracting the distance measured from the anchor edge to the distal end of one of the first pair of holes, relative to the anchor edge, in order to compensate for the offset for the established anchor point.

A variation of this embodiment uses a set of anchoring holes 5A, 5B disposed exactly one-inch from the edge of an established anchor point, and comprises the steps of:

Obtaining two elongated and rigid tool-support members 12A, 12B, each of which is adapted to pierce the surface of the structure 18 to serve as an anchor point for the length measurement;

Obtaining a measuring-tape device 14, 14A, the measuring-tape device having a tang 13 at one end;

Positioning the measuring-tape device's tang 13 and measuring tape 14 between the first and second support members 2, 3, wherein the tang 13 is disposed just beyond, and in contact with, the anchor edge of either the first or second support surface 2, 3;

Placing said multi-tool device 1 at a user-selected position from which a length measurement is to be taken;

Inserting one of the elongated and rigid tool-support members 12A, 12B into and through each of the corresponding pairs of holes associated with the third and fourth pairs of holes 5A, 5B, then causing each of the elongated and rigid tool-support members 12A, 12B to pierce and frictionally couple with the surface of the structure serving as the anchor point, thereby fixing the multi-tool device 1 in place; and Using the measuring-tape device 14, 14A anchored at its tang 13 at said established anchor point by measuring a length over a user-specified span, and subtracting one inch from the indicated tape measurement in order to compensate for the one-inch offset for the established anchor point.

Sixth Embodiment

A Method for Using a Device for Multi-Tool Device for Aiding in Length Measurements from a Location Unsuited for Using a Measuring-Tape Device Refer to FIGS. 1-2B. This embodiment is directed generally to another method for using a multi-tool device 1 according the First Embodiment, discussed supra, to act as a small block rule (such as, in one embodiment, a two-inch block rule with a plurality of measurements markings along at least one edge 8) for use in a closed location that renders the use of a measuring-tape device as cumbersome. In one variation, the method comprises the steps of:

Placing said multi-tool device at location to be measured, ensuring that said plurality of markings for length measurements is visible to the user; and Measuring length as needed.

Seventh Embodiment

A Method for Using a Device for Multi-Tool Device as a Securing Clip for Documents and/or Bags of Goods Refer to FIGS. 1-2A, 6A-6C. This embodiment is directed generally to a method for using a multi-tool device 1 according the First Embodiment, discussed supra, as a heavy-duty holder of documents, or as a clip for one or more bags of goods. In one variation, the method comprises the steps of:

Pliably spread apart the non-coupled side of the first and second support members 2, 3 of the multi-tool device 1;

Inserting the end of one or more user-selected documents, or alternatively the user-closed end of one or more bags of goods, between the first and second support members 2, 3; and Releasing the first and second support members 2, 3 of the multi-tool device 1, thereby causing the multi-tool device 1 to clamp the end of inserted one or more documents, or alternatively the one or more bags of goods, and thus secure them

Eighth Embodiment

A Method for Storing a Device for Multi-Tool Device as a Securing Clip for Documents and/or Bags of Goods Refer to FIGS. 1-2A. This embodiment is directed generally to a method for storing a multi-tool device 1 according the First Embodiment, discussed supra, the multi-tool device adapted to have magnetic properties to facilitate convenient storage of the multi-tool device on a ferromagnetic surface. In one variation, the method comprises the step of causing a multi-tool device 1 support surface 2, 3, the support surface 2, 3 having magnetic properties, to magnetically couple with a ferromagnetic surface.

Alternative Embodiments and Other Variations

The various embodiments and variations thereof described herein and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the claims which follow.

What is claimed is:

1. A multi-tool device for assisting with various measurements of length, including facilitating hypotenuse tape measurements, the device comprising:
    a first support member,
        wherein said first support member is planar and substantially rectangular in shape,
        wherein said first support member has at least one straight edge adapted to be engaged with the tang of a measuring-tape device;
    a second support member,
        wherein said second support member is planar and substantially shaped and sized the same as said first support member, and
        wherein said first and second support members are disposed adjacent to one another, but separated by a distance along at least one pair of corresponding edges;
    a coupling member,
        wherein said coupling member is adapted to couple said first and second support members along one of the corresponding edges of said first and second support members, and
        wherein said separation distance between said first and second support members is provided by said coupling member;
    a first pair of holes disposed in and through said first support member,
        wherein an imaginary line traversing through the center of both holes of said first pair of holes is substantially parallel with one of said at least one straight edge adapted to be engaged with the tang of a measuring-tape device; and
    a second pair of holes disposed in and through said second support member,
        wherein said second pair of holes is disposed to be located at positions on said second support member that correspond to the positions of said first pair of holes, and
        wherein said corresponding first and second pairs of holes are adapted for each pair of corresponding holes to receive and hold an elongated and rigid tool-support member inserted by a user through said multi-tool device;
    wherein:
        said first support member has an edge adapted to facilitate hypotenuse measurements,
            said designated hypotenuse-measuring edge having a center marking, equidistant from each end of said designated hypotenuse-measuring edge,
            said designated hypotenuse-measuring edge having two substantially equal-length lined markings emanating from said center marking,
            each said lined marking being orthogonal with respect to the other said lined marking,
            each said lined marking's distal end, relative to said center marking, intersecting with an edge adjacent to said hypotenuse-measuring edge, and
            each said lined marking extending to a different first support member edge that is adjacent to said designated hypotenuse-measuring edge;
        one hole of said first pair of holes is disposed tangentially along the outer side of one of said lined markings emanating from said center marking along said hypotenuse-measuring edge;
        the other hole of said first pair of holes is disposed tangentially along the outside of the other of said lined markings emanating from said center marking along said hypotenuse-measuring edge;
        each said hole of said first pair of holes is disposed along its associated lined marking at a substantially equal distance from said center marking, and generally disposed at the midpoint of its associated lined marking; and
        said corresponding first and second pairs of holes are adapted for each pair of corresponding holes to receive and hold an elongated and rigid tool-support member inserted by a user through said multi-tool device in order to engage an outer edge of a substantially right-angled corner, forming an anchor point from which a hypotenuse tape measurement is to be made, with said center marking being disposed at or near the apex of said right-angled corner.

2. The device of claim 1, wherein:
    said first support member has a plurality of markings along at least one edge adapted to facilitate length measurements along said at least one edge; and
    each of said first and second support members are equally-sized squares of pre-determined edge length to be effective for small length measurements in difficult-to-access areas.

3. A method of using a multi-tool device according to claim 2, said multi-tool device adapted to act as a two-inch block rule for use in a closed location that renders the use of a measuring-tape device as cumbersome, the method comprising the steps of:
    placing said multi-tool device at location to be measured, ensuring that said plurality of markings for length measurements is visible to the user; and measuring length as needed, in two-inch increments.

4. The device of claim 1, further comprising:
a third pair of holes disposed in and through said first support member for establishing an anchor point to facilitate length measurements from a rough or rounded surface,
  wherein each hole of said third pair of holes is disposed tangentially to a straight line that spans across two opposite edges of said first support member,
  wherein each hole of said third pair of holes is disposed on the same side of said straight line as the other hole of said third pair of holes,
  wherein said straight line can be real or imaginary,
  wherein said straight line is disposed to be substantially parallel with, and disposed one inch from, at least one edge of said first support member, said at least one edge to serve as the anchor edge for a length measurement, and
  wherein each hole of said third pair of holes are separated by a distance;
a fourth pair of holes disposed in and through said second support member for establishing an anchor point to facilitate length measurements from a rough or rounded surface,
  wherein said fourth pair of holes is disposed to be located at positions on said second support member that correspond to the positions of said third pair of holes for facilitating length measurements from a rough or rounded surface, and
  wherein said corresponding third and fourth pairs of holes are adapted for each pair of corresponding holes to receive and hold an elongated and rigid tool-support member inserted by a user through said multi-tool device in order to engage an outer edge of a substrate, forming an anchor point from which a tape measurement is to be made.

5. A method of using a multi-tool device according to claim 4 to make a length measurement from a rough or rounded surface; said rough or rounded surface lacking a definitive corner edge upon which the tang of a measuring-tape device can be readily abutted; the method comprising the steps of:
  obtaining two elongated and rigid tool-support members;
  obtaining a measuring-tape device, said measuring-tape device having a tang at one end;
  positioning said measuring-tape device's tang and measuring tape between said first and second support members, wherein said tang is disposed just beyond, and in contact with, said anchor edge of either said first or second support surface;
  inserting one of said elongated and rigid tool-support members into and through each of said corresponding pairs of holes associated with said third and fourth pairs of holes;
  placing said multi-tool device, with said inserted elongated and rigid tool-support members, and with said measuring tape and tang inserted, over the rough or rounded edge of the structure from which the length measurement is to be taken,
    wherein a longitudinal side of the extended part of each of said inserted elongated and rigid tool-support members is disposed in contact with the distal side of said rough or rounded edge of said structure,
      thereby establishing an anchor point for the length measurement using said measuring-tape device; and
  using said measuring-tape device anchored at its tang at said established anchor point by
    measuring a length over a user-specified span, and
      subtracting one inch from the indicated tape measurement in order to compensate for the one-inch offset for the established anchor point.

6. A method of using a multi-tool device according to claim 4 to make a length measurement from a location on a structure lacking an anchor point, such as in a closed corner, the method comprising the steps of:
  obtaining two elongated and rigid tool-support members, each of which is adapted to pierce the surface of the structure to serve as an anchor point for the length measurement;
  obtaining a measuring-tape device, said measuring-tape device having a tang at one end;
  positioning said measuring-tape device's tang and measuring tape between said first and second support members, wherein said tang is disposed just beyond, and in contact with, said anchor edge of either said first or second support surface;
  placing said multi-tool device at a user-selected position from which a length measurement is to be taken;
  inserting one of said elongated and rigid tool-support members into and through each of said corresponding pairs of holes associated with said third and fourth pairs of holes, then causing each of said elongated and rigid tool-support members to pierce and frictionally couple with the surface of the structure serving as the anchor point,
    thereby fixing said multi-tool device in place; and
  using said measuring-tape device anchored at its tang at said established anchor point, measuring a length over a user-specified span,
    subtracting one inch from the indicated tape measurement in order to compensate for the one-inch offset for the established anchor point.

7. A method of using a multi-tool device according to claim 4, said multi-tool device adapted to act as a heavy-duty holder of documents, or adapted to act as a clip to secure the opening of bags of goods, the method comprising the steps of:
  pliably spread apart the non-coupled side of said first and second support members of said multi-tool device;
  if using said multi-tool device as a document holder, then inserting the end of one or more user-selected documents between said first and second support members;
  if using said multi-tool device as a clip for securing a bag of goods, then inserting the user-closed end of one or more user-selected bags of goods between said first and second support members; and
  releasing said first and second support members of said multi-tool device.

8. The device of claim 1, the device being adapted for use as a document retainer or bag-closure device, wherein:
  said distance between said first and second support members is tapered from said coupling member to reach a smaller separation distance between the distal edges of said first and second support members, relative to said coupling member.

9. The device of claim 8, wherein said smaller separation distance is zero, allowing material from said first and second support members, at or near said distal edges relative to said coupling member, to make contact.

10. The device of claim 1, wherein said first and second support members are comprised of flexibly rigid material.

11. The device of claim 10, wherein said flexibly rigid material is of a type selected from the group consisting of elastomers, hard plastics, vulcanized rubber, metal, and wood.

12. The device of claim 1, wherein said coupling member has magnetic properties.

13. The device of claim 1, wherein at least one of said support members has magnetic properties.

14. A method of storing a multi-tool device according to claim 13, comprising the step of causing a multi-tool device support surface, said support surface having magnetic properties, to magnetically couple with a ferromagnetic surface.

15. A method of using a multi-tool device according to claim 1 to make a hypotenuse measurement from a corner of a structure; said corner structure having a first planar face, a first surface orthogonal to said first planar face, and a second surface orthogonal to said first planar face; the method comprising the steps of:
   obtaining two elongated and rigid tool-support members;
   obtaining a measuring-tape device, said measuring-tape device having a tang at one end;
   positioning said measuring-tape device's tang and measuring tape between said first and second support members,
      wherein said tang is disposed just beyond, and in contact with, the edge of either said first or second support surface, on the end of said multi-tool device having said center marking, and
      wherein said tang is substantially centered over said center marking;
   inserting one of said elongated and rigid tool-support members into and through each of said corresponding pairs of holes associated with said first and second pairs of holes;
   placing said multi-tool device, with said inserted elongated and rigid tool-support members, and with said measuring tape and tang inserted, over the corner of the structure from which the hypotenuse measurement is to be taken,
      wherein a longitudinal side of the extended part of one of said inserted elongated and rigid tool-support members is disposed in contact with said first surface orthogonal to said first planar surface of said structure corner,
      wherein a longitudinal side of the extended part of the other of said inserted elongated and rigid tool-support members is disposed in contact with said second surface orthogonal to said first planar surface of said structure corner, and
      wherein said center marking on said multi-tool device is substantially aligned with the apex of said corner of the structure that serves as the established anchor point for the hypotenuse measurement; and
   using said measuring-tape device anchored at its tang at said established anchor point, measuring a length over a user-specified span.

16. A method of using a multi-tool device according to claim 1 to make a length measurement from a location on a structure lacking an anchor point, such as in a closed corner, the method comprising the steps of:
   obtaining two elongated and rigid tool-support members, each of which is adapted to pierce the surface of the structure to serve as an anchor point for the length measurement;
   obtaining a measuring-tape device, said measuring-tape device having a tang at one end;
   positioning said measuring-tape device's tang and measuring tape between said first and second support members,
      wherein said tang is disposed just beyond, and in contact with, said anchor edge of either said first or second support surface;
   placing said multi-tool device at a user-selected position from which a length measurement is to be taken;
   inserting one of said elongated and rigid tool-support members into and through each of said corresponding pairs of holes associated with said first and second pairs of holes, then causing each of said elongated and rigid tool-support members to pierce and frictionally couple with the surface of the structure serving as the anchor point,
   thereby fixing said multi-tool device in place; and
   using said measuring-tape device anchored at its tang at said established anchor point by
      measuring a length over a user-specified span, and
      subtracting the distance measured from the anchor edge to the distal end of one of said first pair of holes, relative to said anchor edge, in order to compensate for the offset for the established anchor point.

17. A method of making a multi-tool device for assisting with various measurements of length, including facilitating hypotenuse tape measurements, the method comprising the steps of:
   providing a first support member,
      wherein said first support member is planar and substantially rectangular in shape,
      wherein said first support member has at least one straight edge adapted to be engaged with the tang of a measuring-tape device;
   providing a second support member,
      wherein said second support member is planar and substantially shaped and sized the same as said first support member, and
      wherein said first and second support members are disposed adjacent to one another, but separated by a distance along at least one pair of corresponding edges;
   providing a coupling member,
      wherein said coupling member is adapted to couple said first and second support members along one of the corresponding edges of said first and second support members, and
      wherein said separation distance between said first and second support members is provided by said coupling member;
   providing a first pair of holes disposed in and through said first support member,
      wherein an imaginary line traversing through the center of both holes of said first pair of holes is substantially in parallel with one of said at least one straight edge adapted to be engaged with the tang of a measuring-tape device; and
   providing a second pair of holes disposed in and through said second support member,
      wherein said second pair of holes is disposed to be located at positions on said second support member that correspond to the positions of said first pair of holes, and
      wherein said second pair of holes is disposed to be located at positions on said second support member that correspond to the positions of said first pair of holes, and
      wherein said corresponding first and second pairs of holes are adapted for each pair of corresponding holes to receive and hold an elongated and rigid tool-support member inserted by a user through said multi-tool device;
   wherein:

said first support member has an edge adapted to facilitate hypotenuse measurements,
   said designated hypotenuse-measuring edge having a center marking, equidistant from each end of said designated hypotenuse-measuring edge,
   said designated hypotenuse-measuring edge having two substantially equal-length lined markings emanating from said center marking,
   each said lined marking being orthogonal with respect to the other said lined marking,
   each said lined marking's distal end, relative to said center marking, intersecting with an edge adjacent to said hypotenuse-measuring edge, and
   each said lined marking extending to a different first support member edge that is adjacent to said designated hypotenuse-measuring edge;
one hole of said first pair of holes is disposed tangentially along the outer side of one of said lined markings emanating from said center marking along said hypotenuse-measuring edge;
the other hole of said first pair of holes is disposed tangentially along the outside of the other of said lined markings emanating from said center marking along said hypotenuse-measuring edge;
each said hole of said first pair of holes is disposed along its associated lined marking at a substantially equal distance from said center marking, and generally disposed at the midpoint of its associated lined marking; and
   said corresponding first and second pairs of holes are adapted for each pair of corresponding holes to receive and hold an elongated and rigid tool-support member inserted by a user through said multi-tool device in order to engage an outer edge of a substantially right-angled corner, forming an anchor point from which a hypotenuse tape measurement is to be made, with said center marking being disposed at or near the apex of said right-angled corner.

18. The method of claim 17, further comprising the steps of:
   providing a third pair of holes disposed in and through said first support member for establishing an anchor point to facilitate length measurements from a rough or rounded surface,
      wherein each hole of said third pair of holes is disposed tangentially to a straight line that spans across two opposite edges of said first support member,
      wherein each hole of said third pair of holes is disposed on the same side of said straight line as the other hole of said third pair of holes,
      wherein said straight line can be real or imaginary,
      wherein said straight line is disposed to be substantially parallel with, and disposed one inch from, at least one edge of said first support member, said at least one edge to serve as the anchor edge for a length measurement, and
      wherein each hole of said third pair of holes are separated by a distance;
   providing a fourth pair of holes disposed in and through said second support member for establishing an anchor point to facilitate length measurements from a rough or rounded surface,
      wherein said fourth pair of holes is disposed to be located at positions on said second support member that correspond to the positions of said third pair of holes for facilitating length measurements from a rough or rounded surface, and
      wherein said corresponding third and fourth pairs of holes are adapted for each pair of corresponding holes to receive and hold an elongated and rigid tool-support member inserted by a user through said multi-tool device in order to engage an outer edge of a substrate, forming an anchor point from which a tape measurement is to be made.

19. The method of claim 17, the device being further adapted for use as a document retainer, further comprising the step of:
   ensuring said distance between said first and second support members is tapered from said coupling member to reach a smaller separation distance between the distal edges of said first and second support members, relative to said coupling member.

20. The method of claim 17, wherein at least one of said support members has magnetic properties.

* * * * *